Aug. 23, 1955 — H. L. HEINEKE — 2,715,808
LAWN MOWERS
Filed July 1, 1950 — 4 Sheets-Sheet 3
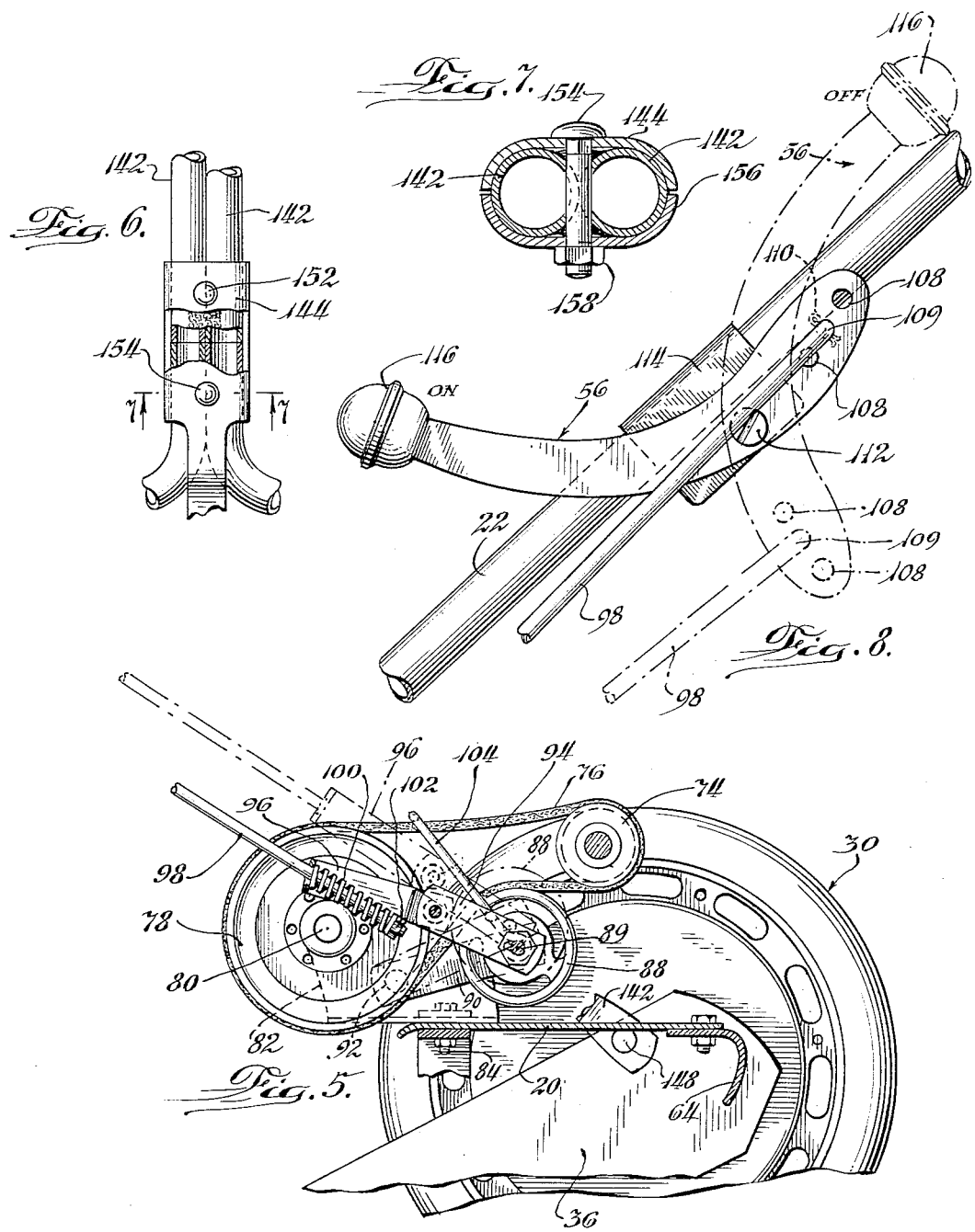

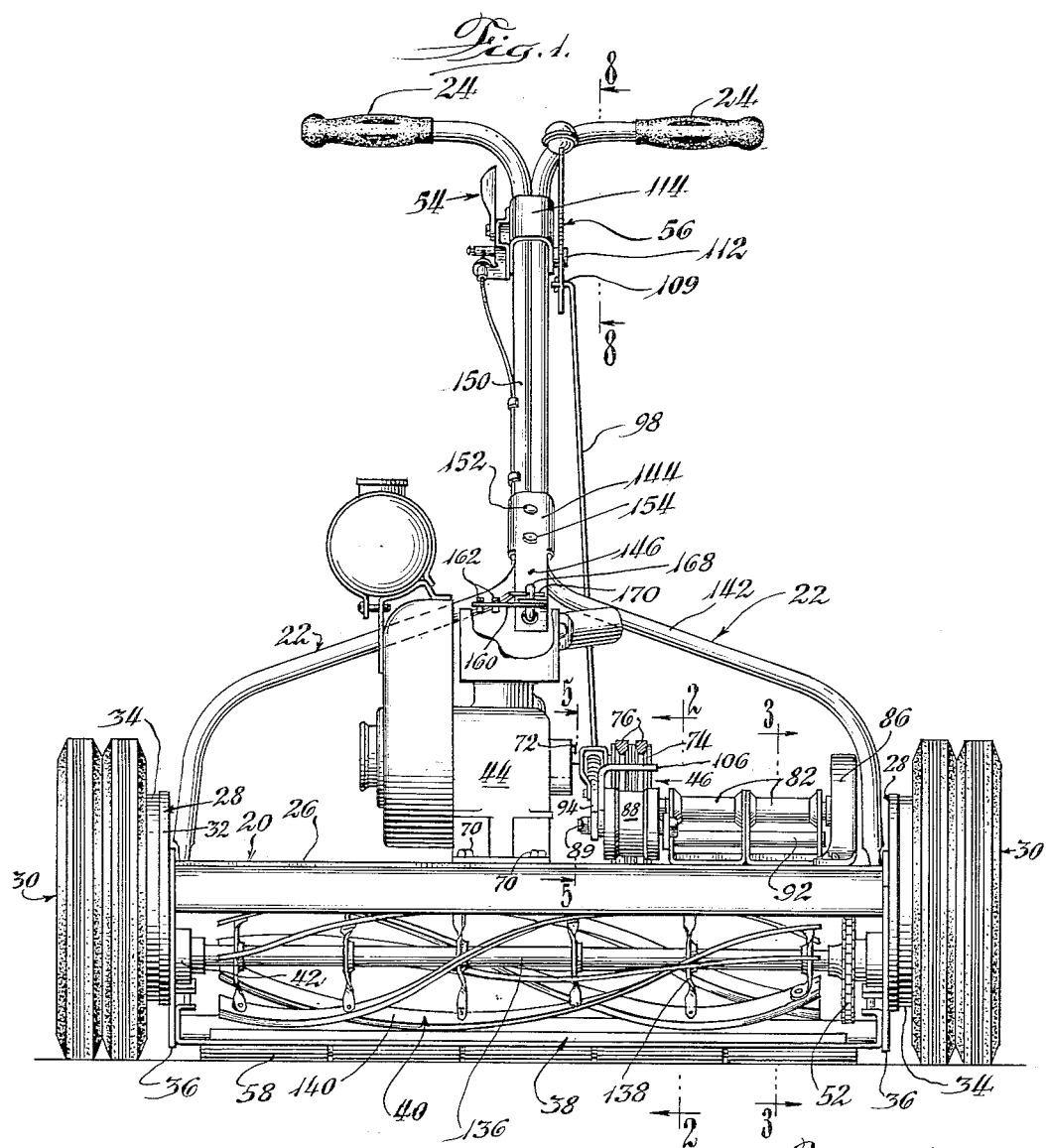

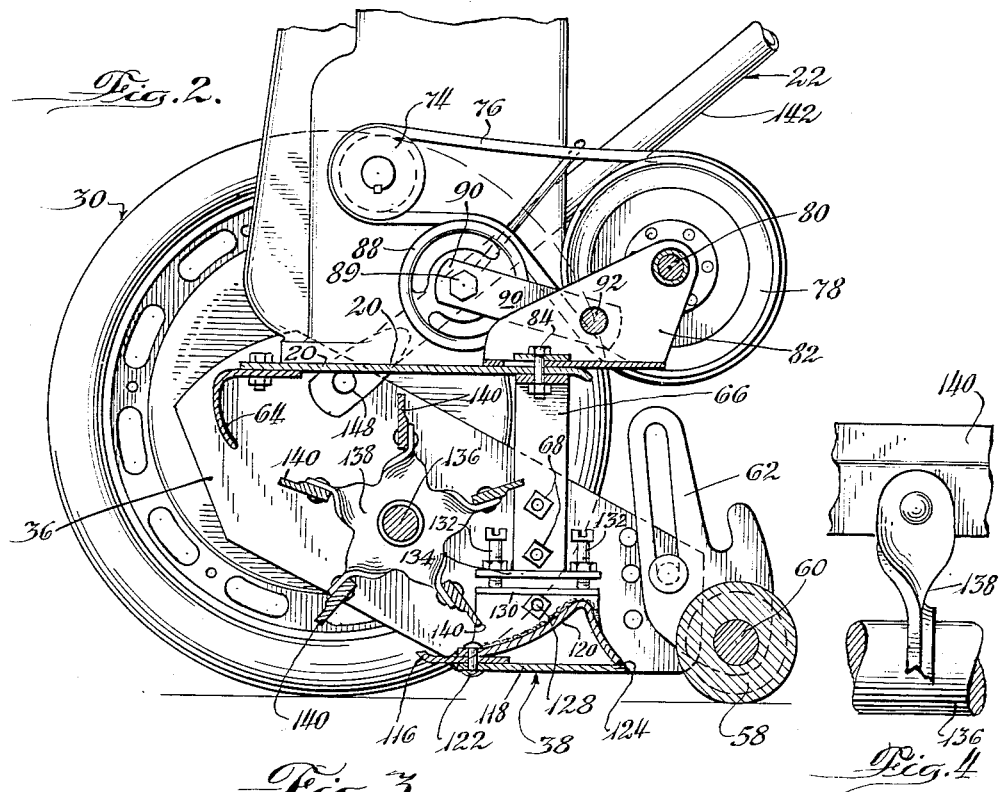
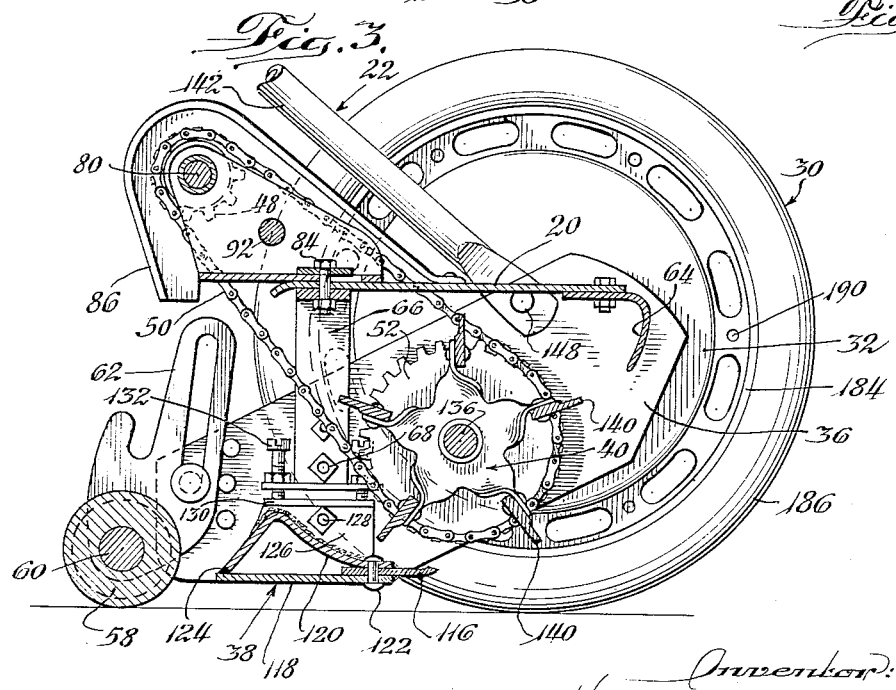

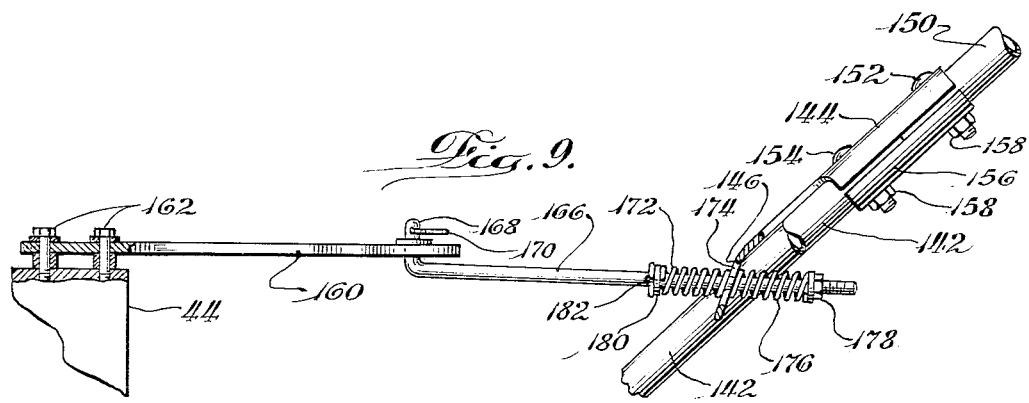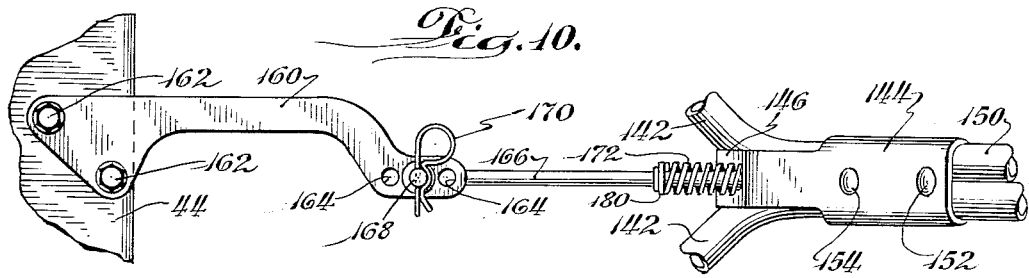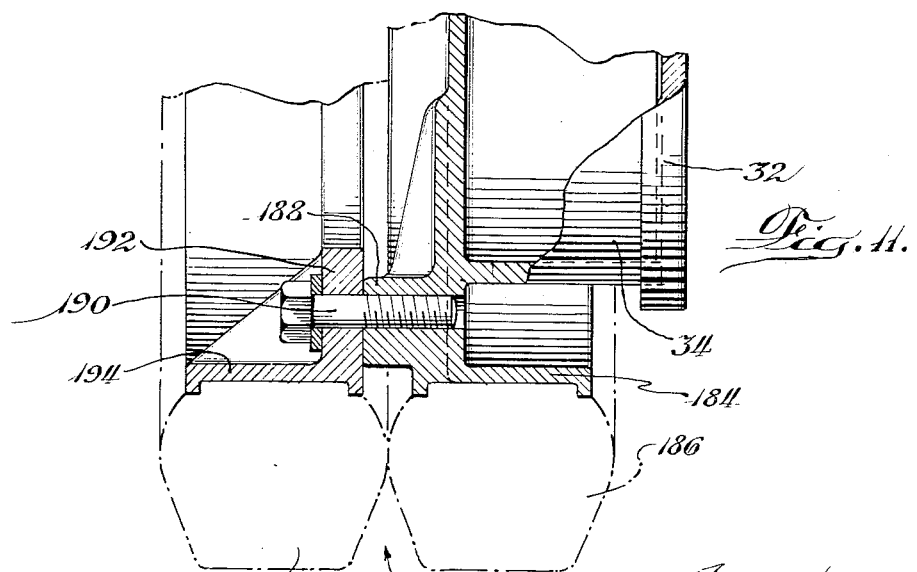

United States Patent Office 2,715,808
Patented Aug. 23, 1955

2,715,808

LAWN MOWERS

Henry L. Heineke, Springfield, Ill.

Application July 1, 1950, Serial No. 171,613

8 Claims. (Cl. 56—26)

The present invention relates to lawn mowers and more particularly to powered lawn mowers although some phases of the invention may be applied to advantage in the manufacture of small hand mowers.

The mower forming the subject matter of the present invention is of the reel type and is largely conventional as to its general organization but differs over conventional construction principally to obtain better operation, greater ruggedness, lower cost of manufacture, better appearance, better handling, and a longer service life. The above may be considered as the principal objects of the present invention.

An additional object is to provide a power lawn mower having an improved clutch and clutch operating mechanism which is effective, trouble-free and economical to manufacture.

Still another object is to provide a novel lawn mower having a handle which is more easily packaged for shipment than is customary.

Yet another object is to provide a lawn mower with an improved reel which is more rugged and can be manufactured at lower cost than is usual.

An additional object is to provide a lawn mower with improved low cost wheels having high load bearing capacity.

Still another object is to provide an improved lawn mower having a novel shock absorbing adjustable support for the handle.

Other objects and advantages will become apparent from the following description of a preferred embodiment of my invention in which similar numerals refer to similar parts throughout the several views.

In the drawings:

Fig. 1 is a front view of a lawn mower embodying features of the present invention;

Fig. 2 is an enlarged vertical longitudinal sectional view through the major portion of the lawn mower and may be considered as taken in the direction of the arrows substantially along the line 2—2 of Fig. 1;

Fig. 3 is an enlarged sectional view similar to Fig. 2 but taken in the opposite direction as indicated by the arrows substantially along the line 3—3 of Fig. 1;

Fig. 4 is a fractional view of a portion of the lawn mower reel drawn to larger scale so as to illustrate a feature of the present invention;

Fig. 5 is an enlarged vertical longitudinal sectional view illustrating principally the clutch mechanism and may be considered as taken in the direction of the arrows along the line 5—5 of Fig. 1;

Fig. 6 is an enlarged fractional view of a portion of the handle and may be considered as taken obliquely downwardly in a direction normal to the plane of the handle;

Fig. 7 is a transverse sectional view through the handle and is taken in the direction of the arrows substantially along the line 7—7 of Fig. 6;

Fig. 8 is an enlarged side view of a portion of the handle illustrating principally the clutch control mechanism;

Fig. 9 is an enlarged fractional view partly in side elevation and partly in longitudinal section illustrating the arrangement for adjustably supporting the handle;

Fig. 10 is an enlarged top view of the portion of the mechanism illustrated in Fig. 9; and Fig. 11 is an enlarged fragmentary vertical transverse sectional view through a portion of the lawn mower wheel illustrating the novel construction thereof.

In common with most power lawn mowers, the mower of the present invention is made up of a carriage generally indicated by the numeral 20 to which a handle 22 is pivoted at each side so as to have hand grips 24 at the upper end of the handle in a position where they may be easily held by the operator.

The carriage 20 has a platform member 26 which extends from side to side of the mower in a horizontal position between circular vertical side plates 28 to which the wheels 30 are journalled, the side plates 28 having outwardly turned peripheral flanges 32 which act as closures for bell housings 34 formed as a portion of the wheels and within which the driving mechanism which links the wheels and the reel is located. This driving mechanism may be considered as essentially conventional and needs no specific discussion here. The round side plates 28 also support downwardly and rearwardly inclined flat side plates 36 which carry the lawn mower bed knife structure indicated generally by the numeral 38. This bed knife extends transversely of the mower and operates in conjunction with a rotatable reel 40 journalled at its ends in bearing boxes 42 carried by the side plate 28.

The horizontal platform 20 supports an internal combustion engine 44 which through the medium of a clutch structure 46 drives a sprocket 48 connected by a chain 50 to a sprocket 52 on the shaft of the reel 40.

The engine throttle is mounted in the upper end of the handle 22 and is indicated generally by the numeral 54. On the other side of the handle there is arranged a pivoted lever 56 for operating the clutch mechanism at 46.

A lawn mower of this type is operated by starting the engine after which the throttle 54 is moved to an appropriate position and the clutch engaged. Thereafter speed is controlled by the throttle 54. The engine through the medium of the clutch 46 drives the reel 40 which operates to cut the grass in conjunction with the bed knife 38, the bed knife being supported at an appropriate height by the wheels 30 and adjustable trailing rollers 58 mounted upon a rod 60 carried at its ends by adjustable fittings 62 secured to the downwardly inclined side plates 36. The rotating reel through customary one way clutches drives the wheels 30 which propel the lawn mower forward. At any time its forward motion may be stopped by disengaging the clutch mechanism 46.

The horizontal platform 26 is made up of a rectangular piece of steel plate of appropriate dimensions which is bent slightly downwardly at its trailing edge and is bolted at its forward edge to a downwardly curved stiffening and supporting strip 64. The stiffening strip also acts as a grass deflector so as to prevent the rotating reel from throwing grass clippings ahead of the mower. In order to facilitate assembly, the stiffening strip 64 may be welded or otherwise secured at its ends to the downwardly inclined side plates 36 which are cut from sheet stock, these side plates in turn being welded to the circular side plates 28. Near its rearward edge the platform 20 is bolted to L-shaped brackets 66 which extend downwardly and are secured in face to face relation to the downwardly inclined side plates 36 by a vertically spaced pair of bolts 68.

The motor 44 is mounted somewhat off center upon the platform 20 and is secured thereto by bolts 70 and is so positioned that its shaft 72 projects parallel to the transverse center line of the mower. This shaft is equipped with one or more V-belt pulleys 74, two of which are shown in the present embodiment. These are connected by V-belts 76 to driven pulleys 78 mounted upon a power transfer shaft 80 which is arranged parallel to the motor shaft 72 with the pulleys 78 and 74 aligned. The transfer shaft 80 is carried in one or more bearings included as a portion of brackets 82 secured to the platform 20 by bolts 84. As best shown in Fig. 2 the brackets 82 are slotted at the bolts 84 so that by loosening these bolts the brackets may be moved backwardly or forwardly so as to give the proper spacing between the motor shaft and transfer shaft centers to accommodate variations in the lengths of the V-belts 76.

The outboard end of the transfer shaft 80 is equipped with the sprocket 48 previously referred to which is connected by a roller chain 50 to the sprocket 52 carried at the end of the reel 40. As a safety precaution the sprocket 48 and the portion of the roller chain 50, which is above the platform 20, is enclosed by an appropriately shaped guard 86 secured to the top of the platform 20.

The spacing between the pulleys 74 and 78 is adjusted so as to be somewhat less than proper to communicate drive directly through the V-belts 76. Because of this slack the motor shaft turns free without driving the pulley 78. This slack is taken up by an idler pulley 88 which is located beneath the V-belts 76 and between the two pulleys. It is journalled to rotate upon a bolt 89 secured to the ends of a pair of arms 90 pivoted to a rod 92 which passes through the brackets 82. The idler pulley 88 is therefore free to swing arcuately upwardly and downwardly about the pivot point established by the rod 92. A pull link 94 is also pivotally connected to the bolt 89 which journals the roller 88. This link is inclined upwardly and rearwardly approximately parallel to the direction taken by the handle 22 and is pivoted at its opposite end to a yoke 96 having an opening through its center to permit passage of a clutch actuating rod 98. The lower end of this rod, which is inside the yoke 96, carries a coil compression spring 100 which is prevented from slipping off the end of the rod 98 by a nut 102 threaded thereto. As the rod 98 is pulled upwardly therefore in the general direction of the hand grips 24, it pulls upwardly on the traction linkage consisting of the yoke 96 and link 94, and pulley axle 89. This causes the idling pulley 88 to engage the belts 76 so as to take up the slack therein and communicate the drive from the pulleys 74 to the pulleys 78. Because of the interposition of the compression spring 100 the rod 98 when pulled outwardly engages the clutch and then may move a considerable distance beyond this position without changing the belt tension an excessive amount.

In order to save wear upon the belts when the clutch actuating rod 98 is moved downwardly so as to permit the pulley 88 to fall away from the belts 76, the pulley axle 89 also carries a bail 104 formed of small diameter steel rod which extends upwardly and is bent to have a horizontal portion 106, which passes over the tops of the belts 76. Downward movement of the pulley 88 brings this horizontal member 106 against the upper surfaces of the belts 76 and pushes them downwardly slightly which it has been found aids in reducing the friction between the belts 76 and the pulleys 74 when the clutch is disengaged.

The opposite or upper end of the clutch control rod 98 is bent over as at 109 and hooked through one of several holes 108 of the clutch control lever 56 previously mentioned. It may be secured in place by a cotter pin 110 passed therethrough. In general the holes 108 in the lever 56 are near one end thereof and this lever is pivoted at an intermediate point about a bolt 112 which is threaded into a U-shaped bracket 114 secured to the handle 22 near the upper end thereof. The opposite or upper end of the clutch lever 56 may, if desired, be provided with a knob 116. When the operator grasps the knob 116 and pulls it toward him, the lower end of the lever 56 will be pivoted downwardly and forwardly so as to urge the clutch control rod downwardly thereby releasing the clutch. When the knob 116 is pushed away from the operator it pulls the clutch control rod upwardly thereby engaging the clutch and compressing the spring 100 until when the knob 116 is in its extreme forward position the upper end of the rod 98 will pass over the pivotal center of the lever 56 established by the bolt 112. In this over center position the inner end of the bent over portion 100 will be brought against the lower surface of the handle 22 which acts as a stop to prevent further pivoting movement. The U-shaped bracket 114 into which the pivoting bolt is threaded on one side also has a downward extension on the opposite side to which the engine throttle control 54 is mounted. This throttle control needs no detailed discussion since it comprises the usual pivoted lever connected to a Bowden wire leading to the engine carburetor.

The lawn mower bed knife, indicated generally by the numeral 38, comprises a hardened steel cutting strip 116 which operates in conjunction with the reel 40 and which is clamped between a flat sole plate 118 and an upper shaped member 120, the assemblage being secured together by spaced rivets 122 passed through the three members toward the forward edges of the plates 118 and 120, these forward edges being in approximate alignment vertically. This connection between these three members may also be welded, if desired, for additional strength. The upper member 120 is shaped to curve upwardly and backwardly and thence sharply downwardly where its rearward edge again is brought against the sole plate 118 and is welded thereto as at 124. This construction gives a very rigid low cost bed knife and in addition causes the grass clippings to be swept upwardly and rearwardly so that they fall easily into a trailing basket if one is to be used with the mower.

At its ends the assembly made up of the two plates 118 and 120 and the strip 116 is welded to upstanding bracket members 126 which are secured by a single bolt 128 at each side to the downwardly inclined side plates 36 so that the bed knife can pivot about these bolts. Above these bolts the bracket members 126 are bent inwardly to form flat horizontal surfaces 130 which are engaged near their front and back ends by front and back adjusting screws 132 threaded through horizontal bracket members 134. These brackets may be welded to the side plates 36 or may be formed as a bent over extension of the platform support brackets 66. In either event by loosening one of the screws 132 and tightening the other, the bed knife structure may be rotated about the bolts 128 so as to adjust the clearance between the edge of the cutting strip 116 and the reel.

The reel is made up of a central rotating rod or tube 136 which is journaled at its ends in the bearing blocks 42 previously referred to and which carries the sprocket 52. This rod 136 carries a plurality of spiders 138 which in the present instance have five arms each attached to helical blades 140. Each of these spiders is cut from plate stock or heavy sheet metal with the central opening punched and extruded so as to fit the rod 136 to which they are welded. The individual arms, after being blanked out, are twisted through somewhat less than 90° (enough so that the ends of the arms will lie flat against the backs of the blades 140) and this twisting operation is so carried out that the ends of the arms lie across the plane of the central portion of the spider.

Each of these arms is then drilled or punched and the arms are secured to the blades by means of a single rivet passed through each arm and its blade. The position of the rivet holes and hence the rivets is such that these rivets lie substantially in the plane of the central portion of the spider. This has an important advantage over conventional construction in which ears are normally bent to one side principally in that it causes the recurring stresses imposed between the blades and the spider to occur in balanced relation to the central portion of the spired thereby preventing the usual racking at the rivets. The result is that a single rivet is more satisfactory than the usual arrangement in which more than one rivet is used. The result also, of course, is that lighter metal may be used for the spiders and this reduces their cost both because less metal is used and also because the lighter gauge metal is easier to shape to the desired contour.

The handle indicated generally by the numeral 22 is formed of steel tubing but unlike conventional handles is formed in two pieces of approximately the same overall dimensions so that the handle, when separated into its two pieces and when separated from the lawn mower proper, can be packed for shipment in the same box with the lawn mower thereby obviating the necessity of supplying a separate long shallow box to house the handle as is the usual custom.

The lower portion of this handle is formed of a pair of steel tubes 142 having their upper ends welded together in side-by-side relationship. These upper ends are also embraced by a U-shaped clip 144 which is welded thereto and which has a downward extension 146, the function of which will be described presently. Below this clip the two tubes are spread apart so as to form a wide broad yoke, the lower ends of which are bent so as to be approximately parallel with the extreme ends flattened and punched to embrace a pair of pivot pins 148 secured to the lawn mower side plates 36. These pins are located slightly above and slightly behind the center of rotation of the wheels 30 so that the plane of the handle, when in its normally upwardly inclined position, passes approximately through the bolt 89 which journals the clutch idling roller 88 when the clutch is in the engaged position. The downward extension 146 of the U-shaped clip 144 is bent downwardly between the arms of the yoke formed by the tubes 142 so that this downward extension is approximately in a vertical plane when the lawn mower handle has what may be considered as a normal inclination.

The upper portion of the handle is also formed of a pair of steel tubes 150 which are welded together in side-by-side relationship at intervals throughout the major portion of the length. These tubes 150 are of the same size as the tubes 142 and therefore there lower ends may be brought into alignment witth the upper ends of the tubes 142. The two sets of tubes, or in other words, the two halves of the handle are secured together in end abutting relationship by a pair of bolts 152 and 154 which pass downwardly through the U-shaped clip 144, one of these bolts passing through the upper set of tubes and the welded connection between these tubes, while the other bolt passes through the lower set of tubes and the welded connection between these tubes. The bolts also pass through a second U-shaped clip 156 which embraces the lower halves of the tubes, the assemblage being held together by nuts 158 threaded to the lower ends of the bolts.

The upper ends of the tubes 150 are bent apart and fitted with rubber hand grips 24 and just below the point where these tubes separate they are embraced by and welded to the U-shaped clip 114 previously mentioned.

In order to hold the handle of the lawn mower in an upwardly inclined position, such that it may be easily grasped by the operator, a bracket cut from steel plate stock and indicated by the numeral 160, is secured to two of the engine cylinder head bolts 162 and extends backwardly in a horizontal plane and near its rearward end is perforated with a plurality of longitudinally spaced vertical holes 164. A rod 166 has one end bent over at right angles and this bent end, indicated at 168, is passed upwardly through one of the holes 164 and is secured by a removable wire cotter key or its equivalent 170. This rod 166 extends backwardly through a compression coil spring 172, thence through a vertical slot 174 in the downward extension 146 of the handle clip 144, through a second compression coil spring 176 and at its extreme end is threaded and fitted with a washer and nut 178 which retains the spring 176 in place. Just ahead of the forward spring 172 the rod 166 is equipped with another washer 180 retained by a cotter pin 182. Thus by tightening the nut 178 the two springs 176 and 172 are brought to bear in opposite directions against the downward extension 146 of the handle clip 144. The inclination of the handle is adjusted by selecting one of the holes 164 to embrace the bent over portion 168 at the forward end of the rod 166.

This construction, it will be seen, permits the handle to be adjusted as desired and although the inclination of the handle is thus determined positively, the mounting nevertheless is somewhat resilient so as to absorb shocks due to rough ground when the mower is in operation. The arrangement also takes advantage of the fact that the top of the engine is at approximately the same level as the lower end of the clip 144 and since the engine is a comparatively massive structure which is solidly connected to the platform 26 of the mower, it acts as an extremely rigid and effective bracket for attachment of the handle support to the mower carriage.

Although this lawn mower may be fitted with wheels of the usual type, I have found that such mowers in their larger sizes with ordinary wheels impose a loading upon the ground which distorts the surface of the turf. This is particularly true if the ground is somewhat damp. The mower which forms the subject matter of this invention therefore is equipped with a special wheel structure which is essentially an arrangement for having two semi-pneumatic tires in side-by-side relationship. The wheel is made up of a main wheel element which preferably is formed as a casting and includes the bell housing 34 and a rim portion 184 to which the tire 186 is fitted. This tire bulges outwardly laterally of the rim. Just radially inside the rim portion the casting is formed to provide a plurality of circularly arranged bosses 188 having a length such that they extend laterally beyond the rim 184 by a distance approximately equal to twice the outward lateral projection of the tire 186 beyond this edge of the rim.

These bosses are threaded to receive bolts 190 which pass through an inwardly extending angular flange 192 of a second rim 194 fitted to a second tire 196 which may be considered as identical to the tire 186. When the bolts 190 are inserted and tightened therefore the inner face of the outer rim 192 is held tightly against the ends of the bosses 188 and the tires 196 and 186 are just brought together at their widest dimension. The effect is to produce a tire having twice the width of the ordinarily used tire with a peripheral notch or groove formed at its center. This results in reducing the loading upon the turf per unit of area to one-half in an effective and low cost manner. Also if desired the lawn mower may be supplied with the main wheel portions only for use on relatively hard ground and the additional tire 196 and rim 194 may be sold as an accessory to those users whose turf has a softer and more easily disturbed character.

Although I have described but a single embodiment of my invention, it will be appreciated that variations may be made therefrom without departing from the scope and spirit of the invention. The invention therefore is to be measured by the scope of the following claims.

I claim:

1. A power lawn mower comprising a wheeled carriage having a motor thereon, clutch means of the type which includes a pair of pulleys, a belt loosely interconnecting said pulleys, an idler adapted to be moved against said belt to tighten it, and a member carrying said idler for said movement on said carriage for connecting said motor for driving said mower, a handle pivoted to said carriage along a horizontal axis and movable throughout a limited angular range, a clutch operating handle movable between limits secured to said mower handle near the outer end thereof, a clutch actuating traction linkage on said carriage connected for moving said idler and disposed closely adjacent to said mower handle pivoting axis, and means connecting said linkage to said clutch operating handle, the last said means including a resilient portion and extending adjacent the centerline of said mower handle, so that movement of said mower handle within said limited angular range will not change the distance between said clutch operating handle and said linkage by an amount greater than that compensated for by said resilient portion.

2. A power lawn mower comprising a wheeled carriage having a motor thereon, clutch means of the type which includes a pair of pulleys, a belt loosely interconnecting said pulleys, an idler adapted to be moved against said belt to tighten it, and a member carrying said idler for said movement on said carriage for connecting said motor for driving said mower, a handle pivoted to said carriage along a horizontal axis, adjustable resilient supporting means for connecting said handle to said carriage to provide for limited resilient angular movement of said handle relative to said carriage within any of several selected ranges, a clutch operating handle movable between limits secured to said mower handle near the outer end thereof, a clutch actuating traction linkage on said carriage connected for moving said idler and pivoted about a horizontal axis above but closely adjacent to said mower handle pivoting axis, and means connecting said linkage to said clutch operating handle, the last said means including a resilient portion and extending adjacent to the centerline of said mower handle, so that movement of said mower handle into or within any of said ranges will not change the distance between said clutch operating handle and said linkage by an amount greater than that compensated for by said resilient portion.

3. A power lawn mower comprising a wheeled carriage having a motor thereon, clutch means of the type which includes a pair of pulleys, a belt loosely interconnecting said pulleys, an idler adapted to be moved against said belt to tighten it, and a member carrying said idler for said movement on said carriage for connecting said motor for driving said mower, a handle pivoted to said carriage along a horizontal axis and movable within a limited angular range, a clutch operating lever pivoted to said mower handle near the outer end thereof, a clutch actuating traction linkage on said carriage connected for moving said idler and disposed closely adjacent to said handle pivoting axis, and means connecting said linkage to said clutch operating handle, the last said means including a resilient portion and a rod extending adjacent to the centerline of said mower handle, so that movement of said mower handle within said limited angular range will not change the distance between said clutch operating lever and said linkage by an amount greater than that compensated for by said resilient portion, the outer end of said rod being bent toward said mower handle and passing through an opening in said clutch lever so that the bent end of said rod engages said mower handle in one position of said clutch lever and acts as a stop to limit movement of said lever in one direction.

4. In a lawn mower of the type which comprises a carriage, a handle pivoted to the carriage, a pair of wheels at the ends of said carriage, a reel supported for rotation on said carriage and means forming a driving connection between the wheels and the reel, the improvement which comprises each of said wheels being formed to provide a bell-shaped housing for enclosing said driving mechanism and a rim spaced outwardly radially of the housing, a semipneumatic tire fitted to said rim, a circular row of bosses disposed radially between said housing and said rim on the outer surface of said wheel and having their ends extending beyond the outer face of said tire, and a second rim having a second tire thereon identical to the first said tire, said second rim having an inwardly extending annular flange and being secured to said first rim in axial alignment therewith by bolts passing through said annular flange and into said bosses, the length of said bosses being such that when said flange is secured against the ends of said bosses the first tire and the second tire are brought together at their widest dimensions.

5. In a lawn mower of the type which comprises a carriage, a handle pivoted to the carriage, a pair of wheels at the ends of said carriage, a reel supported for rotation on said carriage and means forming a driving connection between the wheels and the reel, the improvement which comprises each of said wheels being formed to provide a bell-shaped housing for enclosing said driving mechanism and a rim spaced outwardly radially of the housing, a semipneumatic tire fitted to said rim, and a second rim having a second tire thereon identical to the first said tire, said second rim having an inwardly extending annular flange and being secured to said first rim in axial alignment therewith by bolts passing through said annular flange, and abutment means against which said second rim is held by said bolts for spacing said second rim from said first rim a distance such that the first tire and the second tire are brought into contact at their widest dimensions without there being any substantial sidewise thrust imposed upon one of the tires by the other tire.

6. A power lawn mower comprising a wheeled carriage having a motor thereon, said motor having a pulley on the shaft thereof, a second pulley arranged to drive said mower, a V-belt extending loosely between said pulleys, an idler adapted to be moved to tighten said belt to affect power transfer between said pulleys, a handle pivoted to said carriage along a horizontal axis, an idler operating handle movable between limits, one of which is an over-center limit, secured to said mower handle near the outer end thereof, an idler actuating linkage on said carriage connected to move said idler to tighten said belt, and means connecting said linkage to said clutch operating handle, said connecting means including a resilient portion so that movement of said handle to said over-center limit brings said idler to bear against said belt resiliently to avoid excessive tension thereof and to maintain the tightness of said belt at various angles of said handle relative to said carriage.

7. A power lawn mower comprising a wheeled carriage having a motor thereon, said motor having a pulley on the shaft thereof, a second pulley arranged to drive said mower, a V-belt extending loosely between said pulleys and an idler adapted to be moved to tighten said belt to affect power transfer between said pulleys, a handle pivoted to said carriage along a horizontal axis and movable throughout a limited angular range, an idler operating handle movable between limits secured to said mower handle near the outer end thereof, an idler actuating traction linkage on said carriage connected for moving said idler into engagement with said belt and disposed closely adjacent said mower handle pivoting axis, and means connecting said linkage to said idler operating handle, said connecting means extending adjacent the center line of said mower handle and including a resilient portion so that movement of said mower handle within said limited angular range will not change the distance between said idler operating handle and said linkage by an amount greater than that compensated for by said resilient portion to impose excessive tension on said belt and to maintain the tightness of said belt at various angles of said handle relative to said carriage.

8. A handle for a power lawn mower comprising a fork member and a T-shaped member, said fork member being composed of a pair of tubes having their upper ends welded together in side-by-side parallel relation and being bent apart over an intermediate part of their length, their opposite ends being parallel and adapted for attachment to the carriage of said mower, said T-shaped member being composed of a pair of tubes having their lower ends and the major portion of their length welded together in side-by-side parallel relation and their upper portions mutually diverging, a clip containing the upper end of said fork member and the lower end of said T-shaped member in abutting relation, fastening means securing said ends within said clip, said clip having a downwardly projecting tongue thereon formed to be generally vertical as said handle is mounted on said mower and adapted for the attachment of a generally horizontal support member interconnecting said tongue and a point adjacent the top of said carriage.

References Cited in the file of this patent

UNITED STATES PATENTS

| Number | Name | Date |
|---|---|---|
| 1,567,218 | Whitehead | Dec. 29, 1925 |
| 1,780,404 | Schooling | Nov. 4, 1930 |
| 1,858,618 | Carlson | May 17, 1932 |
| 2,070,288 | Mack | Feb. 9, 1937 |
| 2,138,239 | Irgens | Nov. 29, 1938 |
| 2,214,501 | Kinkead | Sept. 10, 1940 |
| 2,292,580 | Moyer et al. | Aug. 11, 1942 |
| 2,368,290 | Donald | Jan. 30, 1945 |
| 2,453,819 | Smith | Nov. 16, 1948 |
| 2,495,372 | Goldberg | Jan. 24, 1950 |
| 2,511,160 | Grobowski | June 13, 1950 |
| 2,519,039 | George et al. | Aug. 15, 1950 |
| 2,545,520 | Kinkead | Mar. 20, 1951 |
| 2,566,164 | Callison | Aug. 28, 1951 |